UNITED STATES PATENT OFFICE.

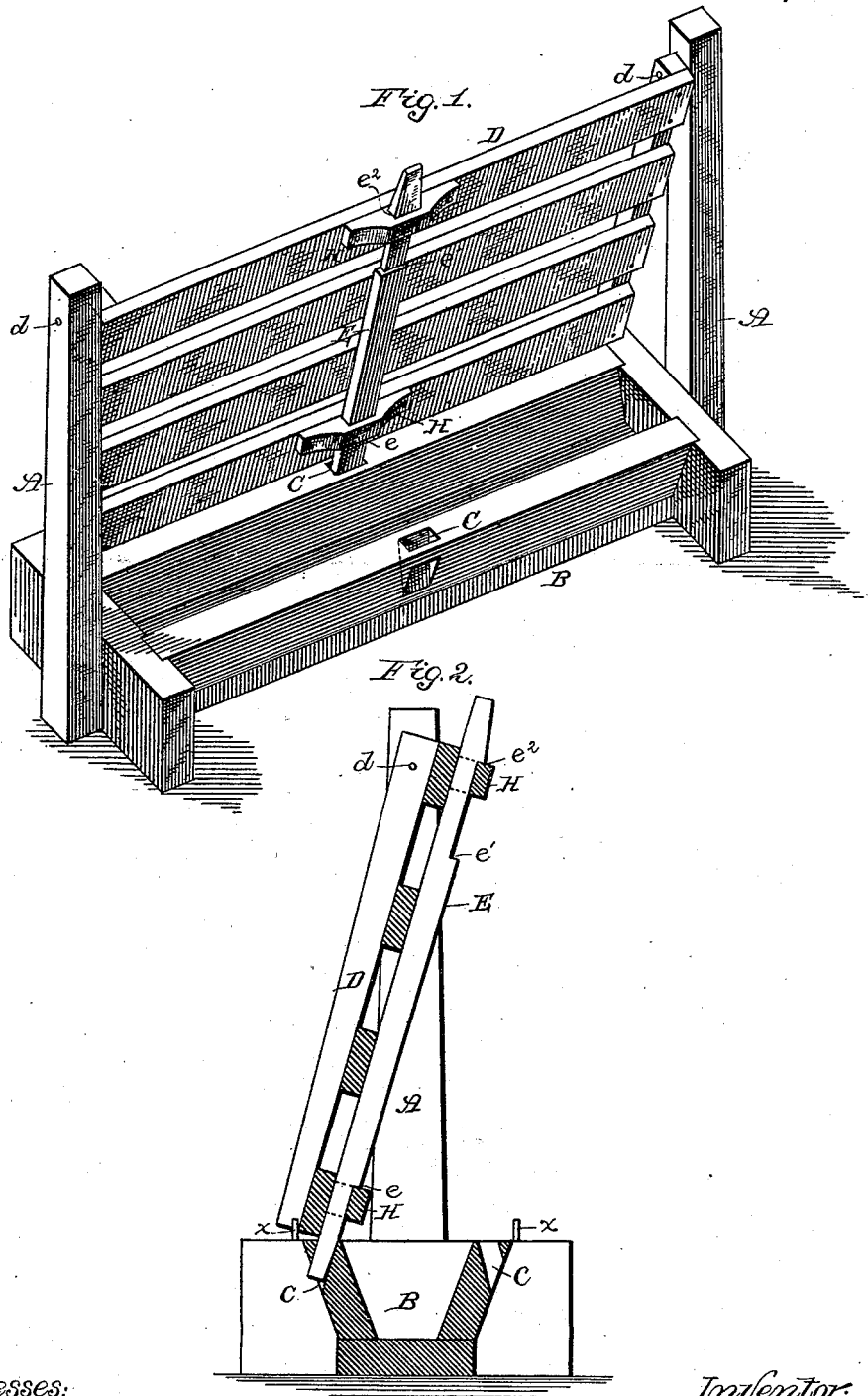

JOHN W. MANNING, OF ARKANSAS CITY, KANSAS.

FEED-TROUGH.

SPECIFICATION forming part of Letters Patent No. 273,116, dated February 27, 1883.

Application filed September 16, 1882. (No model.)

*To all whom it may concern:*

Be it known that I, JOHN W. MANNING, of Arkansas City, in the county of Cowley and State of Kansas, have invented certain new and useful Improvements in Feed-Troughs; and I do hereby declare the following to be a full, clear, and exact description of the invention, such as will enable others skilled in the art to which it pertains to make and use the same.

My invention relates to feed-troughs, the object being to provide a trough of simple, inexpensive, and durable construction, adapted to allow of convenient filling, and so constructed and arranged as to be easily adjusted and securely locked in adjusted position.

The invention consists in the combination, with suitable standards, of a trough provided at each side with sockets and a pivoted gate and lock-bar, as hereinafter fully described, and pointed out in the claims.

In the drawings, Figure 1 is a perspective view of my improvement, and Fig. 2 is a vertical section of the same.

A A represent the standards of the device, which form a part of the pen or sty.

B represents a trough of the usual form, secured between the lower ends of the standards, and provided at each side with a beveled socket, C.

D represents the gate, pivoted at its upper ends to the standards by pivots $d\ d$.

E represents a vertical lock-bar, recessed at its lower end to form a shoulder, $e$, and near its upper end to form shoulders $e'$ and $e^2$. This bar is secured to one side of the gate by means of keepers or slotted cleats H H, secured to the top and bottom rails of the gate. The recessed portions of the bar E are adapted to slide within the keepers, and the shoulders of the bar limit the movement of the latter. Thus it will be seen that the gate may be readily swung from one side to the other of the trough, and it is locked by dropping the lower end of the bar E into one of the sockets C of the trough, said sockets being, as shown, directly opposite each other.

When the trough is to be filled the gate is swung inward and locked, leaving the trough exposed to receive the feed without the annoyance of the crowding of the hogs, and after the trough is filled the gate is swung out and locked in the opposite socket of the trough.

Heretofore various forms of pivoted gates have been used in connection with feed-troughs; but the locking devices used with such gates have been expensive and defective, in that they fail to secure the gate at the point which receives the strain—viz., at the bottom.

My device is designed primarily to furnish a neat, practical feed-trough of cheap and simple form, and provided with a locking device adapted to hold the gate securely at the bottom to enable it to withstand the strain of the snouts of the hogs, sheep, or other animals.

The improvement may be used upon cars, if desired, the gate forming a portion of the side of the car.

If desired, stop-pins $x\ x$ may be provided on the trough to limit the swing of the gate.

It will be apparent that more than one lock-bar may be employed, if necessary, and, instead of slotting the trough, the sockets C may be formed by bending a metallic strip and securing it to the trough, or by securing cleats to the trough.

Having fully described my invention, what I claim as new, and desire to secure by Letters Patent, is—

1. The combination, with standards, of a feed-trough arranged centrally between said standards and provided on opposite sides with inclined sockets, a swinging gate pivoted to said standards over the longitudinal center of said trough, and a sliding locking-bar supported in keepers upon said gate, and adapted to enter the sockets of the trough to securely lock the gate at the bottom against movement from either side, substantially as set forth.

2. The combination, with the standards, of a feed-trough arranged centrally between said standards and provided on each side with sockets beveled at opposite inclinations, a swinging gate pivoted to said standards over the longitudinal center of the trough, and a sliding bar supported in keepers upon said gate and provided with shoulders to retain them within the keepers, said bar being adapted to enter said sockets to lock the gate, as described, and stop-pins projecting from the trough, substantially as set forth.

In testimony whereof I have signed this specification in the presence of two subscribing witnesses.

JOHN W. MANNING.

Witnesses:
L. D. ZENOR,
JNO. D. PRYOR.